W. N. ALLAN.
VEHICLE WHEEL.
APPLICATION FILED AUG. 13, 1917.

1,290,033.

Patented Jan. 7, 1919.
2 SHEETS—SHEET 1.

WITNESSES:

INVENTOR
William N. Allan
BY
ATTORNEY

W. N. ALLAN.
VEHICLE WHEEL.
APPLICATION FILED AUG. 13, 1917.
1,290,033.
Patented Jan. 7, 1919.
2 SHEETS—SHEET 2.
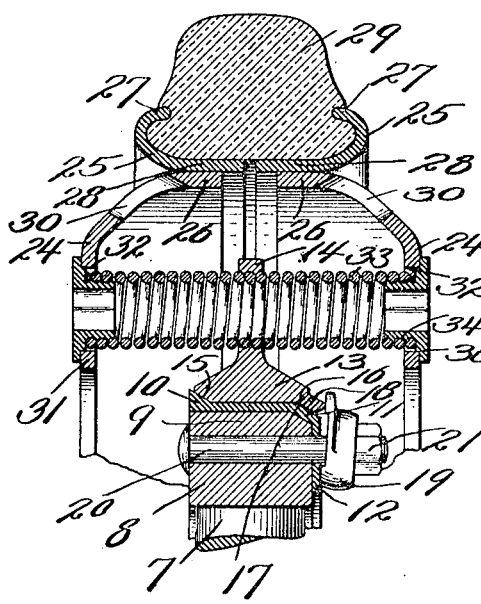
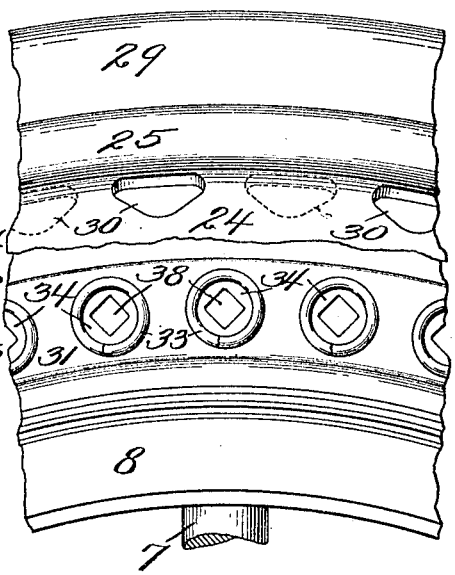
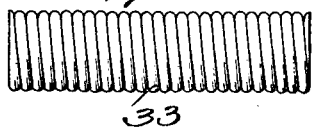
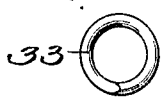
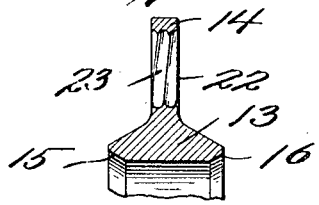
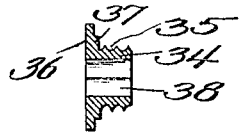
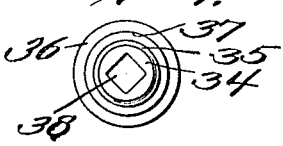
WITNESSES:
INVENTOR
William N. Allan
BY
James L. Norris,
ATTORNEY

UNITED STATES PATENT OFFICE.

WILLIAM N. ALLAN, OF SAN ANTONIO, TEXAS.

VEHICLE-WHEEL.

1,290,033.　　　　　Specification of Letters Patent.　　　Patented Jan. 7, 1919.

Application filed August 13, 1917.　Serial No. 186,021.

*To all whom it may concern:*

Be it known that I, WILLIAM N. ALLAN, a citizen of the United States, residing at San Antonio, in the county of Bexar and State of Texas, have invented new and useful Improvements in Vehicle-Wheels, of which the following is a specification.

This invention relates to vehicle wheels and particularly to a tire therefor. The present invention embodies features of improvement relatively to the construction of tire disclosed in my pending application, Serial No. 159,702, filed April 4, 1917. One object of the present improvement is to dispense with all fastening bolts, rivets, or other penetrating devices for securing the parts to the tire and thereby avoid weakening the said parts and facilitate the assemblage of the tire members in strong operative relation. A further object of the invention is to provide a rim structure for holding the tread member of the tire of material that will have a yielding action so as to compensate for the expansion and contraction of the tire tread member when constructed of material that may vary in accordance with the presence of moisture therein or climatic conditions. In the present tire structure also, the springs are arranged as in the pending application above noted and adapted to carry an equal part of the load, both as to actual weight and driving stress or strain thereon, and also to permit a comparatively greater travel of the tire relatively to a minimized expansion of the springs. The present improved tire also embodies a series of springs so arranged as to work freely in any direction and compensate for side stress as well as angular positions to accommodate variations in the road surface over which the wheel bearing the tire may move. In the present improved construction the springs are terminally held in such manner as to overcome any tendency to crystallization or breakage and may be more readily removed for repair or substitution than in the construction embodied in my pending application, yet serving as a strong yielding retention means when in applied position. Furthermore, in the present improvement, the operation of the springs in the tire is noiseless, and the springs are closely coiled so as to give an equality of spring action on opposite sides of the holding means therefor.

With these and other objects and advantages in view, the invention consists in the preferred construction and arrangement of the several parts which will be more fully hereinafter described and claimed.

In the drawings:—

Fig. 3 is an enlarged transverse section through the tire and a portion of the wheel adjacent thereto, and particularly showing one of the springs in section and the improved means for holding the same in applied position.

Fig. 4 is a side elevation partially broken away of a portion of the improved tire and wheel.

Figs. 5 and 6 are, respectively, a side and an end elevation of one of the springs.

Fig. 7 is a detail sectional view of a portion of the wheel rim showing one of the screw seats therein for engagement with one of the springs.

Figure 1:
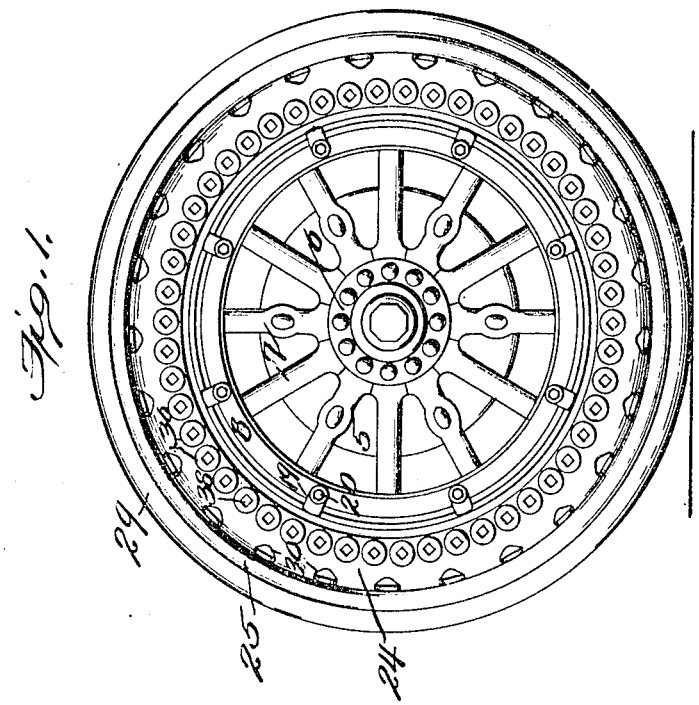
Figure 1 is a side elevation of a wheel embodying the features of the invention.
Figure 2:
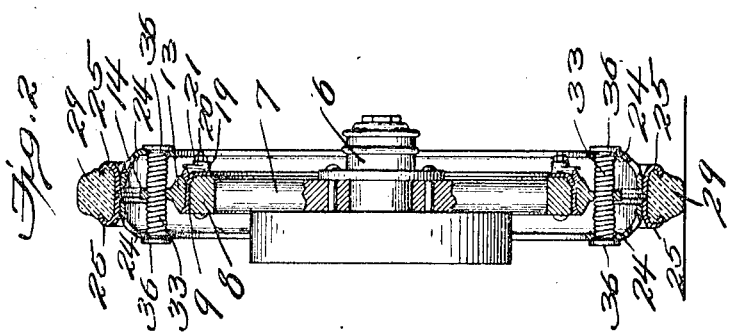
Fig. 2 is a transverse central section of the improved wheel.

Figs. 8 and 9 respectively show a detail section and an end elevation of one of the spring terminal attaching devices.

The numeral 5 designates a wheel embodying a hub 6 and spokes 7 radiating therefrom to a felly 8 provided with a metal rim 9 having a beveled enlarged side edge 10, the opposite side edge being struck downwardly at an angle, as at 11, and continuing into a flange 12 extending over a portion of one side of the felly and held fixed to the latter. The felly as shown is preferably made of wood, but it is obvious that it could be constructed of metal and the periphery shaped to correspond to the contour of the rim 9. In other words, the felly and rim may be made in either one or two parts, the metal rim 9 as shown obviating wear on the felly 8 when constructed of wood. The wheel is also provided with a removable rim 13 formed or provided with an outwardly projecting annular flange 14 centrally disposed with relation to the said removable rim. The removable rim 13 is held on and surrounds the fixed rim 9 and the base thereof is formed with opposite bevels, as at 15 and 16, the bevel 16 fitting snugly upon the enlarged beveled side edge 10 of the rim 9 and the bevel 16 coöperating with the downward bevel 11 of the rim 9 to form a seat 17 in which a locking or keying ring 18 is removably held by flanged collars or washers 19 engaged by bolts 20 extending through the felly 8, the washers 19 being held in snug engagement with the ring 18, as shown by Fig. 3, through the medium of nuts 21. It will therefore be understood that the rim 13 with its flange 14 and the improved tire may be readily withdrawn from or applied over the felly 8 and rim 9 of the wheel 6 and when in applied position will be positively held against displacement or loose movement. At regular intervals the flange 14 is formed with openings 22 having screw threaded or corrugated walls 23.

The improvement embodies a resilient tire organization held or supported by the flange 14 and is removable from and applicable to the felly 8 or the rim 9 of the latter with the rim 13 and said flange 14 as a whole, or, the said tire organization may be partially dismembered for repair and substitution of elements thereof without displacing the rim 13 and its flange 14 from applied position on the wheel. This organization embodies a holding rim comprising duplicate annuli 24 which in practical form will have an inherent resiliency by being preferably constructed of sheet steel, said organization also including tread seating members 25. Each annulus 24 is inwardly and outwardly inclined at its outer portion and has a transversely flat outer extremity or seat flange 26 which is transversely straight and extends partially across the interior of the holding rim. The tread engaging members 25 each have an outer inturned tread engaging flange 27 and an inwardly extending pressure receiving, transversely straight flange 28 bearing upon and overlapping the flange 26 of each annulus 24 and terminating short of the vertical center plane of the holding rim. The flanges 26 and 28 of the annuli and members 24 and 25 of the holding rim serve as the receptive and securing means for a tread device or element 29 which directly engages the road or street surface. This tread device or element 29 may be rubber, rubber compound, wood or any composition suitable for the purpose. The inwardly extending flanges 27 are regularly curved and prevent the tread device or element 29 from becoming accidentally disengaged from the tire holding member constructed as specified, and the flanges 26 and 28 and the annuli and members 24 and 25 have automatic outward and inward compensating movements in the event that the tread device or element 29 is composed of such material as to be affected expansively and contractively by moisture, and after drying or by climatic conditions, the said flanges and annuli and members always tending to assume an inward normal position or to relatively contract when relieved of abnormal resistance to tightly bind the tread device 29 subsequent to an expansion of the said tread holding means. The tractive pressure on the tread device or element 29 tends to force the flanges 26 and 28 inwardly, and this tendency of said flanges sets up a corresponding tendency of the outer portions of the annuli 24 continuous with said flanges 26 and the flanges 27 to draw inwardly. This operation of the various parts and members of the tread holding means or rim is due to and results from the termination of the flanges 26 and 28 short of the vertical central plane of the holding rim for the tread devices, the said flanges always tending to collapse interiorly of said rim. In addition to the advantageous functions of the holding rim for the tread device hereinbefore specified, it also acts as a vibration and shock absorber in view of its inherent resilient nature. The annuli 24 are also formed with a plurality of drain openings 30 at intervals, and the inner flat side members 31 of said annuli have other openings 32.

The improved tire further comprises a plurality of springs 33 which extend fully across the interior of the holding rim for the tire device 29 and between the inner side members 31 of the annuli 24. These springs are closely coiled and threaded through the openings 22 of the flange 14 of the removable rim 13 by rotation thereof similar to the insertion of ordinary screw devices and without jamming or contracting the spring coils and particularly at the portions thereof in engagement with the said threaded openings 22. The springs 33 are continuous from end to end and through the medium of the flange 14 are centrally engaged and removably connected to the rim 13. The terminals of each spring 33 have securing devices inserted therein through the openings 22 from the exterior of the annuli 24. Each securing device for the springs has a hub 34 to fit in the spring terminals and provided with exterior threads 35 to engage and firmly hold a part of the spring coils secured to the hub. The hub 34 extends from a flanged head 36 with an off set 37 against which the outermost spring coil has contact, the outer flanged held 36 bearing against the side member 31 of the annulus 24 through which it is inserted. The bore 38 of the spring securing device is angular for the insertion of the end of a tool or implement whereby the said device may be set or applied to the spring end. When the several spring securing devices are engaged with the spring terminals, the hubs 34 thereof are extended inwardly into the spring terminals far enough to give the springs a positive reliable secured application to the side members 31 of the annuli 24, and the openings 32 are of such diameter as to permit the springs to be inserted therethrough or withdrawn from the interior of the improved tire with ease and facility. It will also be observed that by use of the spring securing devices as explained rigid supports for the ends of the springs are provided and moreover act to draw the annuli 24 inwardly and maintain the said annuli in practical working positions in opposition to each other, but with a yielding connection therebetween due to the interposition of the springs 33 between the side members 31. It will also be seen that the springs 33 are practically disposed in a chamber which is open at its inner portion and fully closed at the outer portion thereof, and ample space is given for the free operation of the springs or to provide for intermediate bending and relaxation of the springs without liability of the springs coming into contact with the adjacent parts of the tire and without the least longitudinal bodily shifting movement of the springs. The springs are also held against loose rattling movement and are therefore noiseless in their operation, and one of the advantages of the present improved construction is the material increase in resilience of the tire due to the fact that each spring is continuous from end to end and has an unbroken insertion through the flange 14 of the rim 13. The attachment of the springs to the rim 13 does not require an intermediate dismemberment of the springs, and as a consequence the disadvantage of short spring lengths and the multiplicity of attaching means in connection with the opposite ends of the springs and at opposite sides of the rim 13 is avoided. Furthermore, by using continuous springs, a superior resilient action results in the tire and the springs as a whole coöperate with sufficient sensitiveness to permit the wheel tire and wheel to conform with the angular irregularities of the road surface and also to compensate for side stress, the group of springs in each tire at the same time taking the load and operating advantageously in the running of the wheel. A still further advantage in the present improvement is that the resilient effect of each spring is obtained from the center thereof by reason of the continuous structure of each spring and the securement at opposite ends, the several springs resiliently bending at the center during the operation of the tire. It will be understood that the improved tire embodies in its organization a demountable rim or the rim 13 having a spring engaging flange 14, together with the features of construction heretofore explained, and therefore the said tire as a whole may be readily removed from or applied to a wheel.

The spring securing devices embodying the threaded hubs replace penetrating fasteners or bolts commonly used in securing springs and other parts of a tire and it will be observed that no part of the holding rim for the tread device 29 is perforated by securing devices, the flanges 26 and 28 being secured preferably by welding or analogous means. Consequently the strength of the said holding rim for the tread device 29 is not in the least weakened or impaired by the application of bolts or rivets thereto. In practice the annuli 24 and members 25 of the holding rim will be constructed from pressed steel so as to provide a strong and durable rim structure of a light character.

I claim as my invention:—

1. A tire comprising a removable rim, a tread-holding rim embodying resilient components having outer inwardly projecting flanges with the edges thereof spaced apart fully around the said tread-holding rim, a solid tread device held by the said tread-holding rim, and closely coiled springs having central portions detachably engaging the removable rim and held in fixed operative position with relation to the latter rim, the said springs projecting equal distances in transverse directions on opposite sides of the removable rim and also having their ends detachably secured to inwardly projecting portions of the tread-holding rim and insertible and withdrawable through said portions of the tread-holding rim.

2. A tire comprising a removable rim, a tread-holding rim embodying resilient components having outer inwardly projecting spaced flange members which are automatically movable with relation to each other, a plurality of closely coiled transversely extending springs centrally engaging the removable rim and forming the connecting means between the latter and the tread-holding rim, and means engaging the outer sides of inwardly projecting portions of the tread-holding rim and also extending into opposite ends of the springs to provide reinforcing bearings and attaching means for the ends of the springs to protect the latter against breakage during the operation of the tread-holding rim.

3. A tire having a holding rim composed of oppositely disposed annuli with outer inwardly extending flanges having the inner edges thereof separated, the said rim having a solid tread device mounted in the outer portion thereof, and a plurality of straight transversely extending closely coiled springs interposed between the inwardly projecting side portions of the annuli and provided with detachable securing means between the opposite extremities thereof and the said side portions of the annuli, the said detachable securing means partially extending into the opposite ends of the springs, the springs constituting a connecting means for the said holding rim relatively to a wheel tire.

4. A tire having a holding rim composed of oppositely disposed resilient members provided with inwardly extending overlapping flanges at their outer portions, said flanges terminating short of the vertical center of the rim and automatically movable inwardly and outwardly, a part of said members being also provided with outer inwardly extending terminals to provide a seat, a solid tread device mounted in the said seat, and a plurality of transversely extending springs interposed between inwardly projecting side portions of the said members and terminally connected to the latter by detachable devices partially extending into the ends of the springs to provide bearings for the latter, said springs serving as the connecting means between the holding rim and the rim of the wheel to which the tire may be applied.

5. A tire comprising a removable rim, a resilient tread-holding rim, a plurality of transversely extending springs connected to the removable rim, and attaching devices having threaded hubs removably inserted in and secured to the opposite end of the springs and engaging portions of the said tread-holding rim.

6. A tire comprising a removable rim, a tread-holding rim, a plurality of transversely extending springs inclosed within said rim, and spring attaching devices removably inserted in and secured to the ends of the springs and having flanged heads bearing against the outer portions of the rim, the spring attaching devices being tubular with hubs having exterior threads to engage the spring coils, the bores of the said devices being angular in contour.

7. A tire comprising a removable rim with a flange projecting therefrom provided with a series of openings therethrough, a plurality of closely coiled springs extending transversely and continuously across from one side of the tire to the other and through the openings in the flange of the rim, a tread-holding rim comprising resilient members, removable attaching devices between the opposite side portions of the tread-holding rim and the ends of the springs, and having hubs inserted in the spring ends, and a tread device mounted in the said tread-holding rim.

8. A wheel tire having a rim with a flange, a plurality of transversely arranged continuous springs extending through the flange, a resilient tread-holding rim having openings in the opposite side portions to permit the springs to be inserted therethrough, and hubs inserted in the opposite ends of the springs and inserted through said openings of the side portions of the tread-holding rim and in part bearing against said side portions and forming both end supports and securing means for the spring ends.

9. A tire having an outwardly projecting flange with threaded openings therethrough, a plurality of continuous closely coiled springs extending transversely across the tire and threaded through and removably engaging the flange of the rim and held against longitudinal shifting movement, a resilient tread-holding rim having inner terminals at opposite sides of the said flange, attaching devices inserted in and secured to the opposite ends of the springs and removably bearing against the opposite side portions of the tread-holding rim, and a tread device mounted in the said tread-holding rim.

10. A tire having a rim and flange, a plurality of transversely arranged continuous and closely coiled springs extending through the flange, a resilient tread-holding rim having inwardly projecting flanges and outer tread-holding seat also having inwardly extending flanges overlapping the flanges of the said rim, a tread device mounted in the said seat, and attaching devices removably inserted in the opposite ends of the springs and having flanged heads bearing against the side portions of the tread-holding rim.

In testimony whereof I have hereunto set my hand in presence of two subscribing witnesses.

WILLIAM N. ALLAN.

Witnesses:
  CHAS. S. HYER,
  JAMES L. NORRIS.

Copies of this patent may be obtained for five cents each, by addressing the "Commissioner of Patents, Washington, D. C."